June 26, 1956 J. ENSINK 2,752,497

DEVELOPING ELECTRICAL OSCILLATION

Filed Oct. 25, 1950 2 Sheets-Sheet 1

INVENTOR.

JOHANNES ENSINK

BY [signature]

AGENT

June 26, 1956 J. ENSINK 2,752,497
DEVELOPING ELECTRICAL OSCILLATION
Filed Oct. 25, 1950 2 Sheets-Sheet 2

INVENTOR
JOHANNES ENSINK
BY [signature]
AGENT

United States Patent Office 2,752,497

Patented June 26, 1956

2,752,497

DEVELOPING ELECTRICAL OSCILLATION

Johannes Ensink, Hilversum, Netherlands, assignor to Hartford National Bank and Trust Company, Hartford, Conn., as trustee Application October 25, 1950, Serial No. 191,984

Claims priority, application Netherlands November 8, 1949

8 Claims. (Cl. 250—36)

This invention relates to apparatus for controlling electrical oscillations.

For developing an electrical oscillation controlled by a controloscillation, it is known to use a circuit-arrangement comprising a regenerative feedback oscillator, a pulse mixer, the input of which is coupled to the output of the oscillator and to the control-oscillation source, and an integrating network included in the output of the pulse mixer, across which is developed a voltage which is a measure of the phase difference between the two oscillations supplied to the pulse mixer. In order to maintain a definite phase relation between the control-oscillation and the oscillation to be developed, the regenerative feedback oscillator is provided with a frequency-controlling element, for example, a reactance tube, to which the said out-put voltage of the integrating network is supplied.

The object of the invention is to provide a circuit-arrangement in which the frequency-controlling element and the integrating network can be dispensed with. This not only enables a saving in cost but in addition it obviates instabilities due to the phase shift introduced by the integrating network.

The invention is characterized by a coupling between the output circuit of the pulse mixer and the input circuit of the oscillator and by a phase-shifting network, so that at least the component of the output pulse of the pulse mixer, the frequency of which is equal to the frequency of the oscillator, is fed to the input circuit of the oscillator with a phase-shift of approximately 90° relative to the voltage across the frequency-determining circuit of the oscillator.

In order that the invention may be more clearly understood and readily carried into effect, it will now be described in detail with reference to the accompanying drawing, in which the same reference numerals designate similar circuit elements.

Figs. 4, 4*a*, 4*b* and 4*c* are schematic diagrams of further preferred embodiments of the invention.

Figure 1:
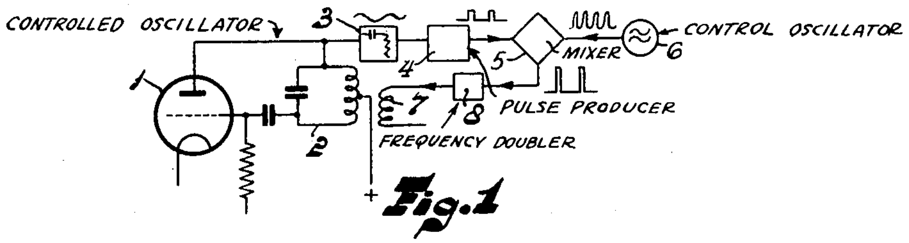
Fig. 1 is a schematic circuit diagram illustrative of the general principle underlying the invention.

Referring to Fig. 1, a regenerative feedback oscillator tube 1 connected, for example, as a Hartley oscillator, is provided with a frequency-determining resonant circuit 2. The output oscillation of the oscillator is fed through stages 3 and 4 (described hereinafter) to the input of a pulse mixer 5, which has also supplied to it an oscillation developed by a control-oscillator 6. The term "pulse mixer" is to be understood to mean a mixer of oscillations one of which is pulsatory, current flowing in the output circuit of the mixer only during the occurrence of the pulses.

In the circuit-arrangement shown in Fig. 1, this pulsatory oscillation is due, for example, to the use of a pulse stage 4, which, for example, converts the output oscillation of the oscillator 1 into pulses of the same frequency. This stage may develop, even simultaneously, phase-shift and/or frequency multiplication or division of the oscillation of the oscillator 1, 2.

In the prior circuit-arrangement the output of the pulse mixer 5 includes an integrating network, across which is developed a control-voltage which is a measure of the phase relation between the two input oscillations of the pulse mixer 5. The shorter the duration of the pulses, the greater the ratio (for example 50:200) between the control-frequency and the frequency developed is allowed to be in order that in any case a sufficiently high control-voltage may be developed. This control-voltage is fed to a reactance tube which is connected in parallel with the frequency-determining circuit 2 of the oscillator, so that the frequency of this oscillator 1, 2 is caused to bear a definite ratio to that of the control-oscillator 6.

According to the invention, the said integrating network and reactance tube are avoided by inserting in stage 3 a network which brings about a phase shift of some 90°, so that the component of the output pulse, the frequency of which corresponds with the frequency of the oscillator 1, 2, that is to say the fundamental wave of the output pulse of the pulse mixer 5, is about 90° out of phase with the voltage across the circuit 2. In addition, the said output pulse is fed through a coupling coil 7 to the input circuit of the oscillator 1, 2 especially to the grid of the tube 1. Obviously, as an alternative the said phase-shifting network may be included in the output of the pulse stage 4 or of the pulse mixer 5.

Figure 2:
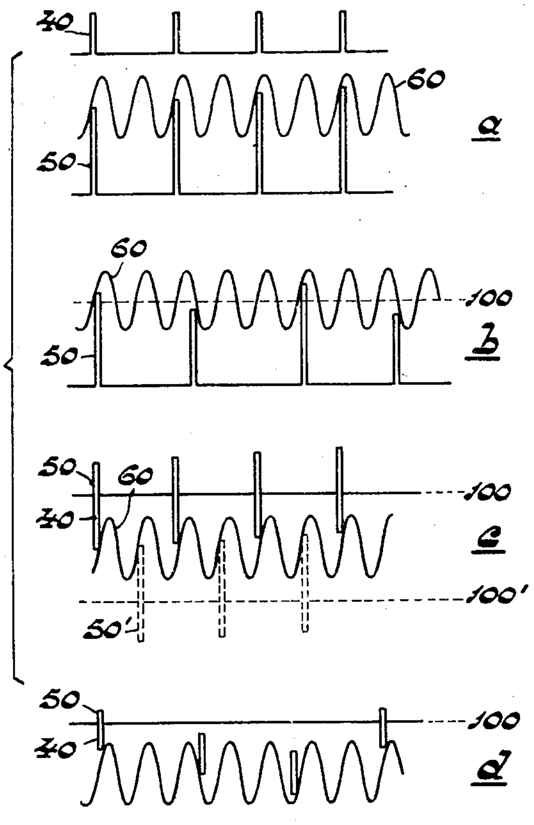
Fig. 2 shows voltage-time diagrams relating to the voltages across the input and output circuits of the pulse mixer.

In Fig. 2 curve 60 denotes as a function of time, the oscillation developed by the oscillator 6 whereas the oscillation developed across the output of the pulse stage 4 is denoted by curve 40.

Figs. 2*a* and 2*b* relate to the case in which the pulse mixer 5 is a multiplicative mixer, for examples, a tube comprising two control-electrodes, such as a hexode or a heptode, to which the two oscillations to be mixed are fed. Developed across the output of the pulse mixer 5 are pulses as represented by the curve 50, the amplitude of which is a measure of the phase relationship between the oscillations 40 and 60. If, for example, as shown in Fig. 2*a*, the frequency of the oscillator 6 is practically a higher harmonic of the frequency of the oscillator 1, 2, the amplitude of the pulse 50 will vary inappreciably. These pulses 50, the fundamental wave of which is in quadrature with the voltage across the circuit 2 will have the effect of bringing about such detuning of this circuit that the frequency of the oscillator 1, 2 will be adjusted to a value equal to a sub-harmonic of the oscillation developed by the oscillator 6. If, for example, the frequency of the oscillator 6 is thus shifted, or if this oscillator is frequency-modulated, a correspondingly smaller frequency shift or modulation of the oscillator 1, 2 will occur.

The frequency produced by the oscillator 1, 2 may also be caused to be equal to a fractional sub-harmonic of the control-frequency, that is to say equal to the control-frequency divided by $n+p/q$, where $n$, $p$ and $q$ designate whole numbers. In the figures, for the sake of clearness, $n$ is chosen to have a low value but in practice this value may be very high. More particularly Fig. 2*b* relates to the case in which the said ratio is equal to $n+\frac{1}{2}$.

In this case the output pulses 50 of the pulse mixer 5 exhibit an alternately greater and smaller amplitude. If they are fed to the input circuit of the oscillator 1, 2 through a threshold voltage, which is approximately equal to the means pulse amplitude (indicated in Fig. 2*b* by a broken line 100) and which consequently permits only the greatest pulses to pass, these pulses will again bring about a frequency variation of the oscillator 1, 2.

As an alternative, these output pulses may be fed to a circuit the tuning frequency of which is, for example, equal to half the pulse frequency and then, through a frequency doubler 8 to the input circuit of the oscillator 1, 2, since the amplitude of the voltage across such a circuit is proportional to the amplitude difference between the greater and smaller pulses 50, shown in Fig. 2*b*.

Figs. 2*c* and 2*d* relate to the case in which an additive mixer is substituted for a multiplicative mixer. The circuit in accordance with this principle is shown in detail in Fig. 3. In an additive mixer the two oscillations 40 and 60 to be mixed are added up and then passed through a threshold voltage, so that only the part of the sum voltage which exceeds this threshold voltage becomes operative. The duration of the input pulse 40 of the mixer stage 5 must not exceed the period of oscillation $t$ of the control-oscillation 60 and is preferably almost equal to half this value.

Figure 3:
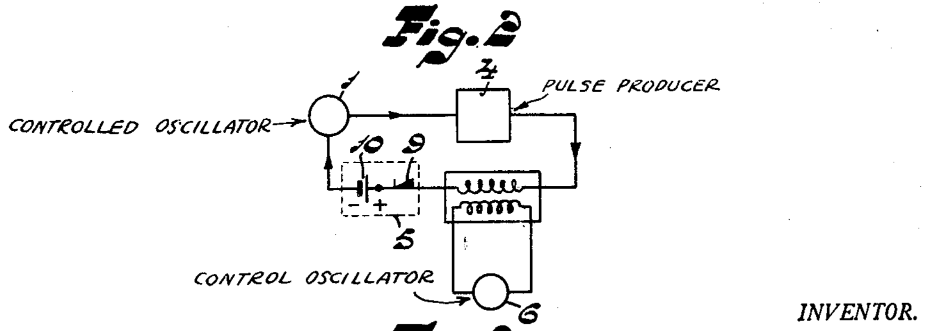
Fig. 3 is a schematic diagram of a preferred embodiment of the invention.

An additive mixer may comprise, for example, a rectifier 9 and a bias voltage source 10, as shown in Fig. 3. Alternatively, the additive mixer may comprise a class C amplifying tube circuit, as shown in Fig. 4*c* in which a tube 25 is biased beyond cut-off by a bias voltage source 26, so that the cut-off point of the tube acts as a threshold voltage, and when the combined oscillations 40 and 60 overcome this threshold voltage, the tube 25 becomes conductive and feeds control pulses 50 to the frequency determining circuit of the oscillator 1.

Fig. 2*c* illustrates the case in which the oscillation developed by the oscillator 1 is a whole sub-harmonic of the oscillation developed by the oscillator 6. The control-oscillation produced by the oscillator 6 thus has added to it the pulsatory oscillation 40 of the pulse converter 4, so that the amplitude of the pulses 50 which project beyond the threshold voltage indicated by the broken line 100 is a measure of the phase relationship between the two oscillations 40 and 60. These pulses 50 are then re-fed to the input circuit of the oscillator 1, 2 and are thus capable of adjusting the frequency of the oscillator 1 to the desired value. The threshold voltage slightly exceeds the amplitude of the control-oscillation 6.

The frequency of the oscillator 1, 2 may be caused in a similar manner to be adjusted to a fractional sub-harmonic of the control-oscillation 6. More particularly Fig. 2*d* illustrates the case in which the frequency of the oscillator 1 is adjusted to a value equal to that of the oscillator 6 divided by $n$ or $n+\frac{1}{3}$ or $n+\frac{2}{3}$. By making the threshold voltage 10, represented in Fig. 2*d* by the broken line 100, high enough for only the pulses 50 projecting beyond the broken line 100 to be fed to the oscillator 1, 2, adjustment to only one of these sub-harmonics is again possible.

In principle, as an alternative, the oscillator 1 may be caused to develop a higher harmonic of the frequency of the oscillator 6 and in this case the output oscillation of the oscillator 1 is fed directly and that of the oscillator 6 by way of a pulse stage to the pulse mixer 5. However, in this case an oscillation will be developed which at any one moment when a pulse occurs exhibits a phase jump and this is generally undesirable.

Figure 4:
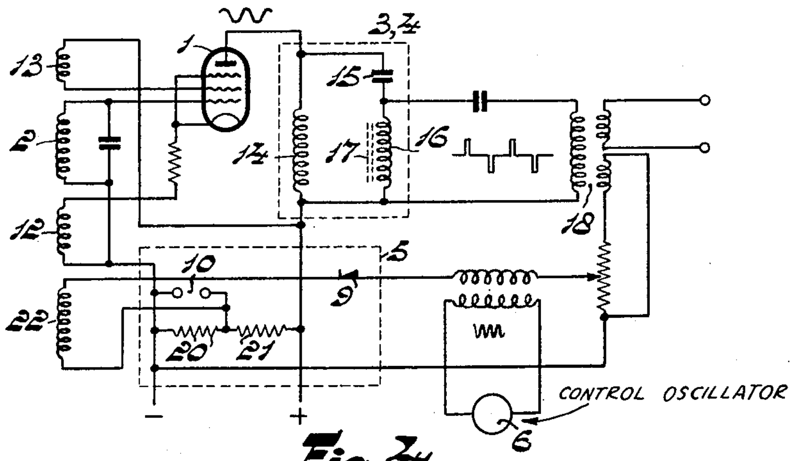

Referring to Fig. 4, 1 designates an oscillator tube with regenerative feedback between the control-grid circuit, including the frequency-determining circuit 2, and the cathode circuit including a coil 12 coupled with the circuit 2. In addition, coil 13 included in the screen-grid circuit of the tube 1 and degeneratively coupled back with the circuit 2 enables the amplitude of the oscillation produced to be substantially independent of variations in the properties of the tube or of the circuit.

The anode circuit of the oscillator tube 1 includes an inductance 14, across which is set up an oscillation substantially corresponding with the tuning frequency of the circuit 2. This oscillation is fed through a capacitor 15 to an inductance 16, comprising a readily saturable ferromagnetic core, for example a ferrite core 17.

Thus, for the period of time in which the saturation point of the ferromagnetic core 17 is overstepped owing to the current passing through the inductance 16, the inductance 16 will in practice act as a short-circuit and will not constitute a high inductance unless the core 17 is not saturated, i. e. at low instantaneous values of the current. For the period of time of non-saturation a positive and negative pulsatory voltage will consequently be produced alternately, this voltage being in addition in quadrature with the voltage across the circuit 2, owing to the presence of the capacitor 15 and the inductance 16. By tuning the circuit constituted by the capacitor 15, the inductance 14 and the inductance 16, the core 17 being removed, to the frequency of the oscillator 1, 2, the oscillator energy produced is largely converted into pulse energy.

This pulsatory voltage is supplied through a coupling transformer 18, together with the oscillation developed by the control-oscillator 6, to a pulse mixer 5, which comprises a rectifier 9 and a threshold voltage source 10 formed by the potentiometers 20 and 21. Thus, the input circuit of the oscillator 1, especially the coil 22 coupled with the circuit 2, has supplied to it pulses, the fundamental wave of which is in quadrature with the voltage across the circuit 2, so that a frequency variation of the oscillator 1 is brought about. Since in addition the circuit 2 is included in the grid circuit of the oscillator tube 1, the energy of the oscillation across the grid circuit is at a minimum, so that the frequency variation is as sensitive as possible, or in other words, a minimum current through the coupling coil 22 is sufficient.

Figures 4A, 4B:
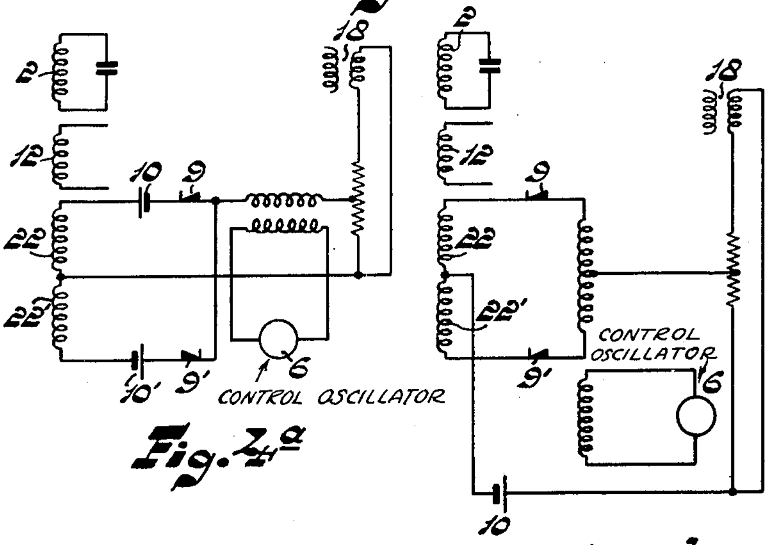
Figure 4C:
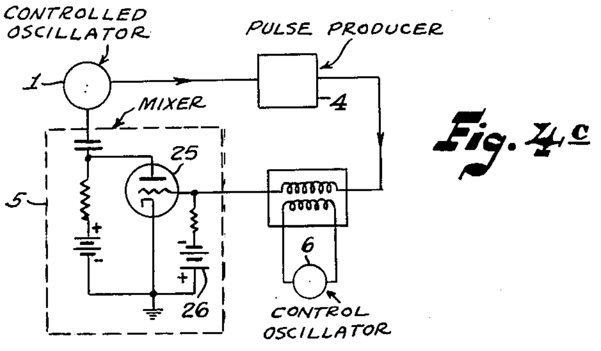

Two-way control can be obtained as shown in Fig. 4*a* with the use of the circuit-arrangement described above by providing a second additive mixer comprising a rectifier 9′ and a bias voltage source 10′, the polarities of which are opposite to those of the rectifier 9 and the voltage source 10. Thus, as shown in Fig. 2*c*, set up across the output of this second additive mixer 9′, 10′ are pulses 50′, the fundamental wave of which is 180° out of phase with the pulses 50, and hence 90° with the voltage across the circuit 2. These pulses 50′ are fed through the coupling coil 22′ to the input circuit of the oscillator 1, 2 and will thus contribute supplementarily to the frequency variation.

As an alternative, two-way control may be obtained by modifying the part concerned or the circuit-arrangement shown in Fig. 4*b*, the current jointly introduced into the circuit 2 by the coupling coils 22 and 22′ being exactly zero when the phases of the pulses 40 and sinusoidal oscillation 60 are equal.

For converting the oscillation produced by the oscillator 1 into a pulsatory oscillation use may alternatively be made of the cascade of a number of saturable coils 16 each comprising a readily saturable ferromagnetic core 17, so that across the output of the pulse stage 4 thus formed are produced pulses of shorter duration which enable frequency variation for higher harmonics. As an alternative, the pulse stage 4 may be constituted by a class "C" operated tube or by a multivibrator.

What I claim is:

1. A control system comprising a regenerative feedback oscillator producing an oscillatory wave and having a frequency determining circuit, an outgoing channel coupled to said oscillator and including means to convert said oscillatory wave into a pulsatory wave, a source of control oscillations, a pulse mixer, means to apply said control oscillations and said pulsatory wave as inputs to said mixer to produce output pulses, an incoming channel coupled to said oscillator and including means coupling the output of said mixer to said frequency determining circuit to apply said output pulses thereto to control the frequency of said oscillatory wave, and a passive phase-shifting network comprising a plurality of impedances at least one of which is a reactance and interposed in one of said channels whereby the component of said output pulses whose frequency corresponds to the frequency of said oscillator is shifted approximately 90° relative to the voltage across said frequency-determining circuit.

2. A system, as set forth in claim 1, wherein the frequency of said oscillator is a whole sub-harmonic of said source of control oscillations.

3. A system, as set forth in claim 1, wherein the frequency of said oscillator is a fractional sub-harmonic of said source of control oscillations.

4. A control system comprising a regenerative feedback oscillator producing an oscillatory wave and having a frequency-determining circuit, an outgoing channel coupled to said oscillator and including means to convert said oscillatory wave into a pulsatory wave, a source of control oscillations, an additive pulse mixer, means to apply said control oscillations and said pulsatory wave as inputs to said mixer to produce output pulses, an incoming channel coupled to said oscillator and including means coupling the output of said mixer to said frequency determining circuit to apply said output pulses thereto to control the frequency of said oscillatory wave, and a passive phase-shifting network comprising a plurality of impedances at least one of which is a reactance and interposed in one of said channels whereby the component of said output pulses whose frequency corresponds to the frequency of said oscillator is shifted approximately 90° relative to the voltage across said frequency-determining circuit.

5. A system, as set forth in claim 4, wherein said additive mixer is constituted by a diode and means to bias said diode.

6. A system, as set forth in claim 4, wherein said additive mixer is constituted by a class "C" amplifying tube circuit.

7. A control system comprising a regenerative feedback oscillator producing an oscillatory wave and having a frequency-determing circuit, an outgoing channel coupled to said oscillator and including means to convert said oscillatory wave into a pulsatory wave, a source of control oscillations, a pulse mixer, means to apply said control oscillations and said pulsatory wave as inputs to said mixer to produce output pulses, an incoming channel coupled to said oscillator and including means coupling the output of said mixer to said oscillator to apply said output pulses thereto to control the frequency of said oscillatory wave, and a phase-shifting network included in said outgoing channel for shifting the component of said output pulses approximately 90° relative to the voltage across said frequency-determining circuit, asid means to convert said oscillatory wave into a pulsatory wave and said phase shifting network consisting of an inductance with a readily saturable ferromagnetic core included in said frequency determining circuit.

8. A system, as set forth in claim 7, wherein said mixer is constituted by a double-acting pulse mixer.

References Cited in the file of this patent

UNITED STATES PATENTS

| | | |
|---|---|---|
| 2,201,978 | Bedford | May 28, 1940 |
| 2,226,459 | Bingley | Dec. 24, 1940 |
| 2,270,023 | Ramsay | Jan. 13, 1942 |
| 2,405,771 | Ziegler | Aug. 13, 1946 |
| 2,459,699 | Hallmark | Jan. 18, 1949 |
| 2,507,317 | Moore | May 9, 1950 |
| 2,617,037 | Hugenholtz | Nov. 4, 1952 |